United States Patent [19]

Bruck et al.

[11] Patent Number: 4,960,472
[45] Date of Patent: Oct. 2, 1990

[54] ANISOTROPIC RESISTIVITY MATERIAL AND METHOD OF MAKING SAME

[75] Inventors: Gerald J. Bruck, Murrysville; Raymond A. Hilgert, Verona; Graham A. Whitlow, Murrysville, all of Pa.

[73] Assignee: Westinghouse Electric Corp., Pittsburgh, Pa.

[21] Appl. No.: 292,180

[22] Filed: Dec. 30, 1988

[51] Int. Cl.[5] ............................................. C21D 8/00
[52] U.S. Cl. .................................... 148/127; 148/903; 428/615
[58] Field of Search ..................... 148/4, 903, 13, 127; 428/610, 615, 635, 675, 931; 310/264, 262; 219/121.63, 121.64, 121.65, 121.66; 29/598; 228/165, 166, 245, 246, 185, 225

[56] References Cited

U.S. PATENT DOCUMENTS

| | | | |
|---|---|---|---|
| 1,991,496 | 2/1935 | Derby | 228/185 |
| 4,474,861 | 10/1984 | Ecer | 219/121.65 |
| 4,555,835 | 12/1985 | Buzzi et al. | 228/165 |
| 4,685,202 | 8/1987 | Booth et al. | 219/121.64 |

OTHER PUBLICATIONS

Uglov, "Lasers in Metallurgy and Technology of Inorganic Materials", Soviet J. Quant. Electronics, vol. 4, pp. 564–572.

Primary Examiner—S. Kastler
Attorney, Agent, or Firm—D. Schron

[57] ABSTRACT

A material which exhibits different resistivity in mutually perpendicular directions is formed by providing sections of a first metal and interposing therebetween relatively thin sections of an insert metal. Passes are made over each section of metal insert with a high energy beam which produces, on each pass, an alloyed zone comprised of the first metal and metal insert and which zone, by different manufacturing techniques, will extend from one surface of the body to an opposed surface. The metal insert may be a thin section of a unitary piece of metal or may be comprised of a plurality of different layers. Alternatively, the metal insert may be comprised of one or more rods inserted into holes drilled into a base member.

11 Claims, 8 Drawing Sheets

ANISOTROPIC RESISTIVITY MATERIAL AND METHOD OF MAKING SAME

FIELD OF THE INVENTION

The invention in general relates to anisotropic resistivity material, which may be used in electrically conducting components.

BACKGROUND OF THE INVENTION

In an anisotropic resistivity material, the electrical resistance as measured in a first predetermined direction is different than the electrical resistance measured in a direction perpendicular thereto.

In the development of high current electrical equipment, there are requirements to control the path of electrical conduction to minimize eddy currents during current transients. One technique to meet the requirements utilizes separate conductors such as wires, cables, or bus bars contiguous but suitably insulated from one another. One disadvantage of this technique is that each individual conductor may not be structurally strong enough for the intended purpose and accordingly, supplemental support structures have to be provided. Additionally, some types of electrical apparatus incorporate high speed contacting sliding surfaces. For example, in homopolar generators the surface of a high speed rotor makes sliding contact with a current collector during some point in its operation. Under such circumstances, a continuous smooth rotor surface is imperative and extremely difficult, if not impossible, to achieve if separate conductors are utilized to construct the rotor in order to minimize eddy currents.

The present invention provides for an anisotropic resistivity material which may be fabricated and patterned to control the direction of electric current flow within an electrical conductor.

SUMMARY OF THE INVENTION

An anisotropic resistivity body of the present invention is made by providing a plurality of sections of a first metal. A relatively thin section of a metal insert is placed between each said section of the first metal, with the first metal and metal insert having different compositions. A high energy beam is passed over each section of metal insert so as to cause, on each pass of multiple passes, an alloyed zone comprised of the first metal and metal insert. Thereafter, depending upon intended use, any undesired excess metal may be removed so as to form a body having smooth surfaces and alternate zones of different resistivity.

In one embodiment, the plurality of sections may be comprised of separate members which sandwich the metal inserts with the arrangement being maintained by clamping means during the high energy beam operation. In another embodiment, a unitary body of a first metal may be machined to provide a plurality of grooves or holes therein so as to define alternate sections and thereafter metal inserts of sheet or rod form are placed within the grooves or holes. The high energy beam traversing the inserts cause the formation of the alloyed zones.

DESCRIPTION OF THE PREFERRED EMBODIMENTS

Figure 1A:
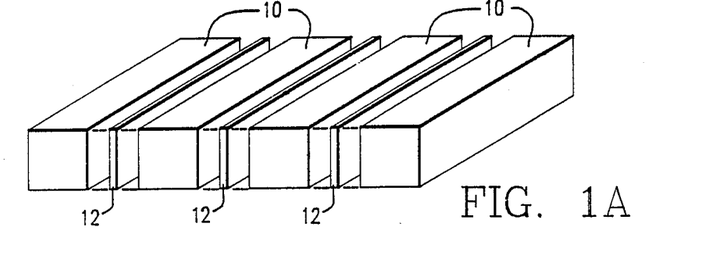
FIGS. 1A through 1D illustrate the fabrication of an anisotropic resistivity body, in accordance with one embodiment of the present invention.

Referring now to FIG. 1A, there is illustrated a plurality of sections of a first metal 10 having interposed therebetween relatively thin sections of a metal insert 12, with the first metal and metal inserts being of different compositions. The term "metal" as used herein means an elemental metal or an alloy.

Figure 1B:
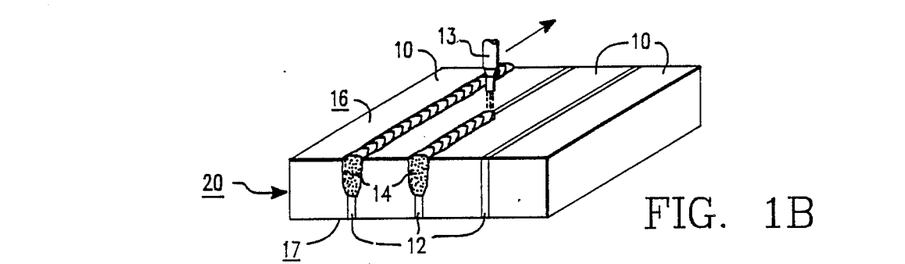

The first metal sections and inserts are held together such as by clamping means, (not shown) and as illustrated in FIG. 1B multiple passes are made over the metal inserts (and a small portion of the adjacent metal sections) by high energy beam apparatus 13 so as to cause, on each of the passes, an alloyed zone 14 comprised of the first metal and metal insert. The high energy beam may, by way of example, be a laser, an electron beam or a plasma arc torch and depending upon the intensity thereof, the alloyed zones 14 extend from a first surface 16 of body 20 toward a second surface 17. In the step illustrated in FIG. 1B, the high energy beam is of a power such that the alloyed zone extends somewhat more than half way from the first toward the second surface.

Figure 1C:
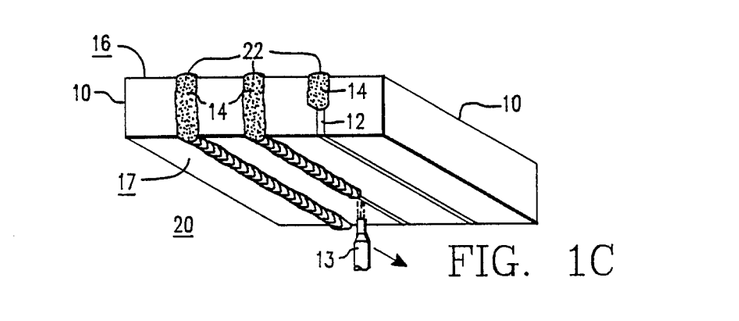
Figure 1D:
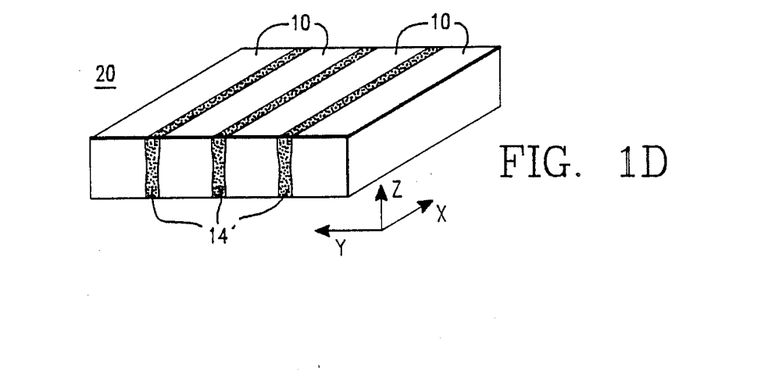

After the multiple passes over the first surface, the high energy beam apparatus is caused to make multiple passes over the metal inserts which are exposed on the opposite surface 17, as illustrated in FIG. 1C. In FIG. 1C it is seen that the alloyed zone 14 as a result of this operation now extends between opposed surfaces of body 20 and leaves a bead 22 as a result of the process. If desired, and depending upon ultimate use, beads 22 may be removed such as by machining, thereby resulting in a body 20 having smooth upper and lower surfaces and having alternate zones 10 and 14 of different resistivity, as illustrated in FIG. 1D. By way of example, the first metal 10 may be copper and the insert 12 nickel, the latter metal which when alloyed with copper has a relatively lower conductivity and higher resistivity than copper. Accordingly, when utilized to carry current, the preferred current direction in the body would be in the direction of the X axis, shown in FIG. 1D, since the resistance in the X axis direction would be less than that in the Y axis direction due to the presence of multiple high resistance alloyed zones 14 in the Y axis direction.

Figure 2A:
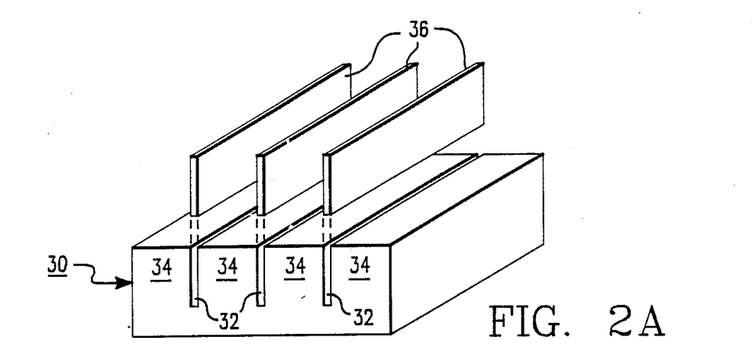
FIGS. 2A through 2C illustrate the fabrication of an anisotropic resistivity body in accordance with another embodiment of the present invention.

In another embodiment of the invention, and as illustrated in FIG. 2A, a solid block 30 of a first metal is provided with a plurality of grooves 32 thereby dividing the first metal into a plurality of sections 34.

Figure 2B:
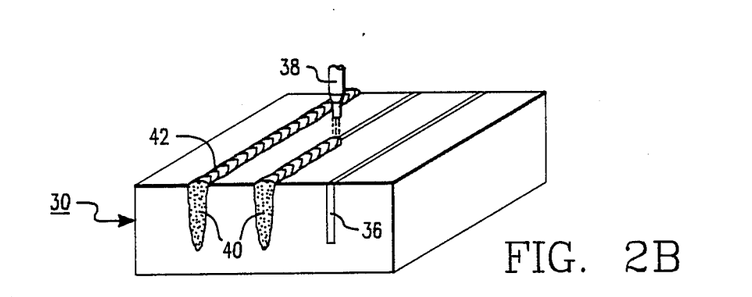

A plurality of relatively thin sections of a metal insert indicated by the numerals 36 are placed within respective grooves 32 and as illustrated in FIG. 2B, high energy beam apparatus 38 making multiple passes over the inserts 36 causes the formation of alloyed zones 40.

Figure 2C:
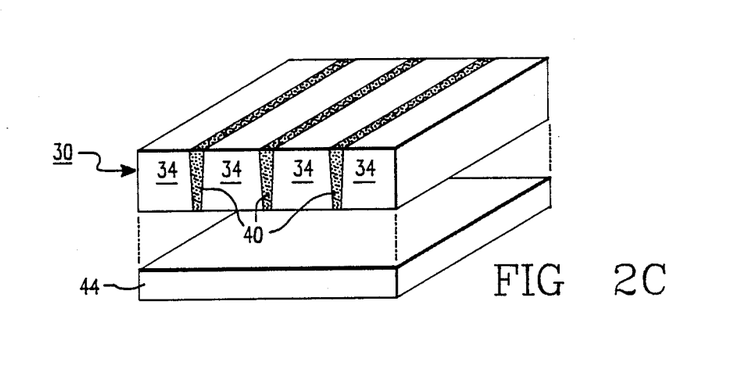

After the multiple passes are made by the high energy beam apparatus 38 excess beading 42 may be removed and, as illustrated in FIG. 2C, the lower section 44 of block 40 may be removed thereby resulting in an anisotropic resistivity body having properties identical to that described with respect to FIG. 1D.

Figure 3A:
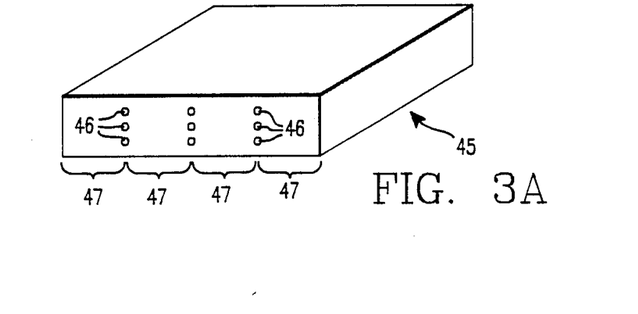
FIGS. 3A through 3D illustrate the fabrication of an anisotropic resistivity body in accordance with another embodiment of the present invention.

Another embodiment of the invention is illustrated in FIGS. 3A to 3D wherein a block of material 45 of a first metal is machined to provide a series of holes 46 separating the block into sections 47, as illustrated in FIG. 3A.

Figure 3B:
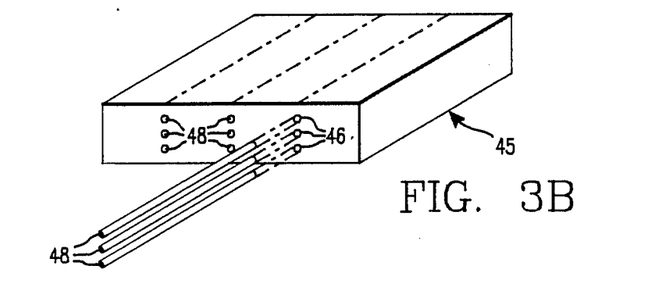

As illustrated in FIG. 3B, metal inserts in the form of thin rods 48 of a second and different metal are inserted in the holes 46 and high energy beam apparatus is caused to make multiple passes over the dot-dash path indicated on the surface of block 45.

Figure 3C:
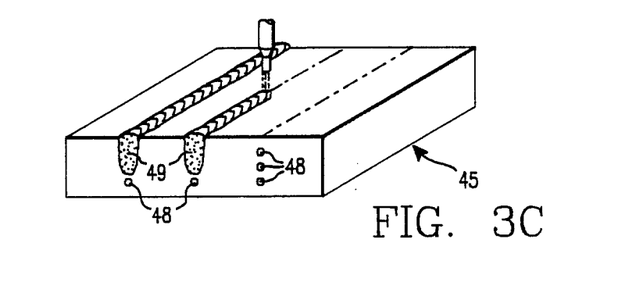
Figure 3D:
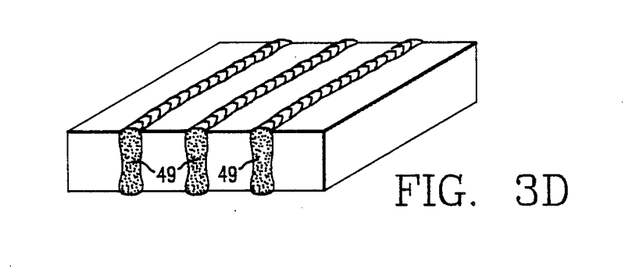

As illustrated in FIG. 3C, alloyed zones 49 are formed after passage of the high energy beam apparatus and after passage over the top surface, the operation may be repeated on the bottom surface, as illustrated in FIG. 3D to complete the alloyed zone separation and the production of an anisotropic resistivity material. Any excess metal may be removed, as previously accomplished in FIGS. 1D and 2C.

Although the anisotropic resistivity material may be used for a variety of different purposes, further fabrication variations will be described by way of example with respect to the production of a current conducting electrical component of a dynamoelectric machine.

Figure 4:
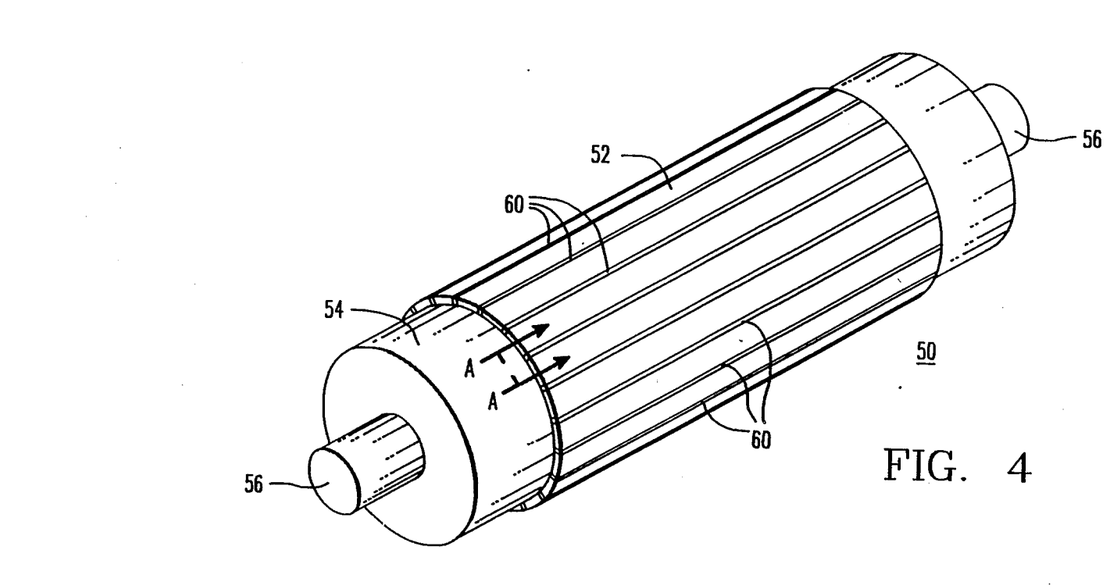
FIG. 4 illustrates a rotor arrangement which may be used in a homopolar generator.

FIG. 4 illustrates a stator structure 50 of a homopolar generator and is comprised of a thin cylindrical shell 52 of a highly conductive non-ferromagnetic material such as copper which is electrically insulated from, and bonded or shrunk onto, a ferromagnetic cylindrical core 54 such as iron. Core 54 comprises the major portion of the rotor mass, which is directly connected to a drive shaft 56 supported, during operation, by means of bearings, (not illustrated).

Cylindrical shell 52 is made in accordance with the teachings herein and includes a plurality of alloyed zones 60 having a higher resistivity than the adjacent metal, and which extends the entire length of the shell. With such arrangement, current flow is predominately confined to an axial direction between the alloyed zones 60 and large circulating eddy currents are minimized, if not eliminated due to the higher resistivity in the circumferential direction as opposed to an axial direction along the shell 52. The rotor per se is more fully described and claimed in copending application Ser. No. 07/284,881 filed Dec. 15, 1988 wherein the anisotropic properties are derived by a different process than described herein.

Figure 5A:
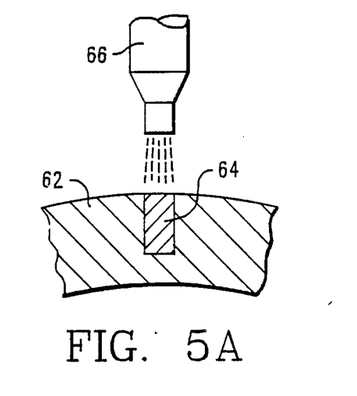
FIGS. 5A through 5D illustrate, in one embodiment, the fabrication of a portion of the rotor of FIG. 4.
Figure 5B:
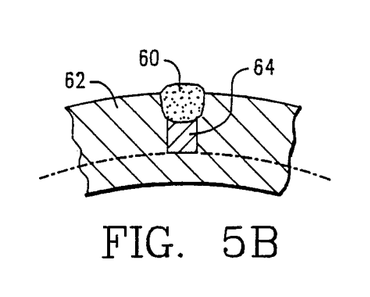

In accordance with one aspect of the present invention, such cylindrical shell may be made by a process illustrated in FIGS. 5A through 5D which may be considered as a view along the line AA of FIG. 4. As illustrated in FIG. 5A, a solid cylindrical shell 62 of a first metal such as copper is provided with a plurality of grooves, and a metal insert, 64 such as nickel, is placed into each one of the grooves over the entire length of the shell. Multiple passes are made, with high energy beam apparatus 66 forming an alloyed zone 60 as illustrated in FIG. 5B, which extends from the outer toward the inner surface of the thin cylindrical shell.

Figure 5C:
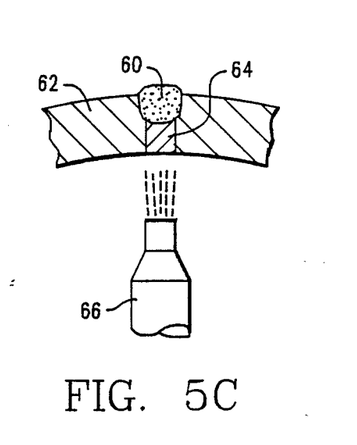
Figure 5D:
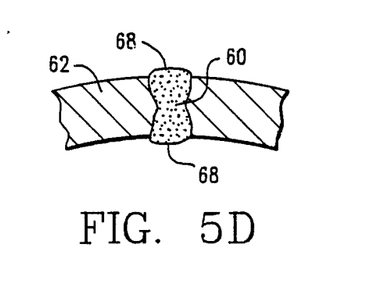
Figure 6:
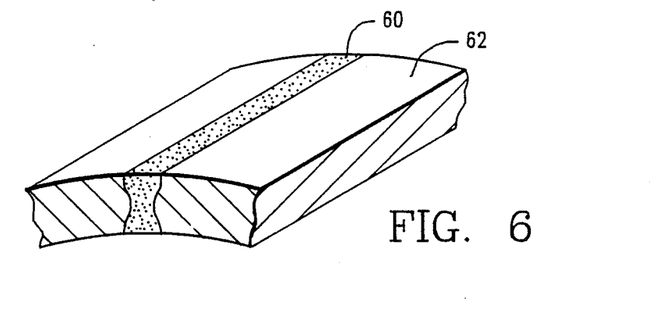
FIG. 6 illustrates a section of the portion, in completed form.

Excess metal is removed from the inner surface of the shell up to the point marked by the dot-dash line of FIG. 5B, and as illustrated in FIG. 5C, the high energy beam apparatus 66 is caused to move over the exposed insert 64 on the inside of the shell to complete the alloyed zone from the outer to the inner surface as illustrated in FIG. 5D. Excess beading 68 is then removed resulting in an ultra smooth surface having alternate zones of high and low resistivity 60, 62 as illustrated in FIG. 6. As brought out in the aforementioned co-pending application, the smooth and uninterrupted outer surface is imperative since any roughness or discontinuity would cause instant damage to the brushes utilized in such homopolar generators.

Figure 7A:
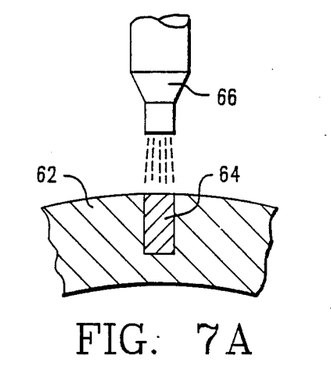
FIGS. 7A through 7E illustrate an alternate method of fabrication of the rotor section of FIG. 3.
Figure 7B:
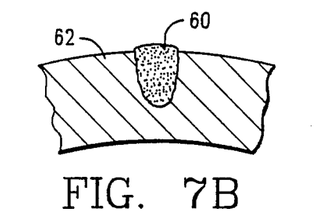
Figure 7C:
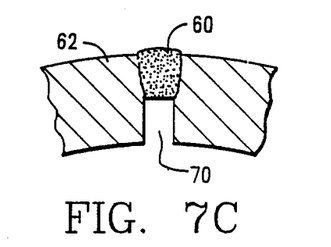
Figure 7D:
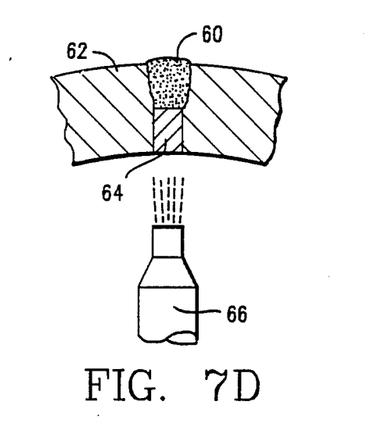
Figure 7E:
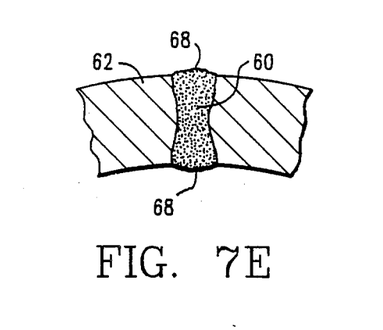

Another embodiment of fabrication of the cylindrical shell is illustrated in FIGS. 7A through 7E. In FIG. 7A, the high energy beam apparatus 66 passing over metal insert 64 causes the formation of an alloyed zone 60 which extends from the outer towards the inner surface of the shell, as illustrated in FIGS. 7B. Instead of removing the inner surface of the shell, a groove 70 is provided as in FIG. 7C, and into which is placed an insert 64, as in FIG. 7D. Subsequent operation of the high energy beam apparatus 66 results in an alloyed zone which extends completely from the outer to the inner surface, as illustrated in FIG. 7E. A subsequent machining operation to remove beading 68 will result in an identical structure as illustrated in FIGS. 6.

Although the structure of FIG. 4 illustrates alloyed zones which extend parallel to the axis of the rotor in order to reduce eddy current, any desired pattern may be provided with proper machining operations, one such further pattern constituted by a spiral arrangement of alloyed zones being described in the aforementioned copending application.

Figure 8:
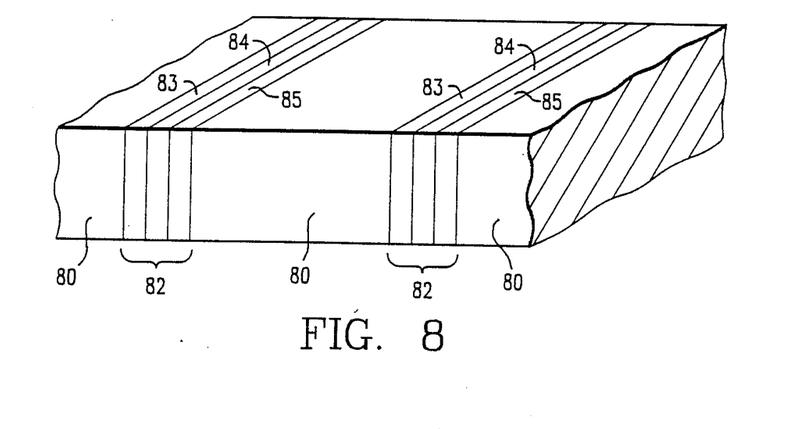
FIG. 8 and 9 illustrate modified forms of metal inserts.

FIG. 8 illustrates a plurality of sections 80 of a first metal having interposed therebetween metal inserts 82. As opposed to a unitary piece of metal insert as previously described in FIGS. 1A and 2A, each of the metal inserts 82 of FIG. 8 is comprised of a plurality of layers of metal 83, 84 and 85, with the exact number of layers being a matter of design choice. By way of example, outer layers 83 and 85 may be of the same composition such as a nickel or nickel alloy, while the middle section 84 may be of iron, in the case of nickel outer layers or nickel in the case of nickel alloy outer layers. When subjected to impingement of a high energy beam, an alloyed zone will be formed which is a combination of the metals of the metal insert and the adjacent sections 80.

Figure 9:
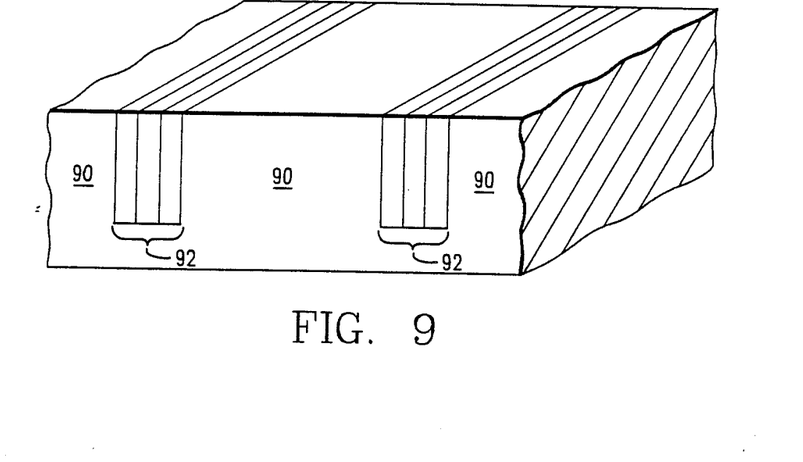

It will be recognized that the FIG. 8 arrangement is similar to that described in FIGS. 1A through 1D, but utilizing a multi-layered insert. FIG. 9 is similar to FIG. 2A and includes a plurality of first sections 90 with multi-layered metal inserts 92 placed into grooves adjacent the sections 90.

Figure 10:
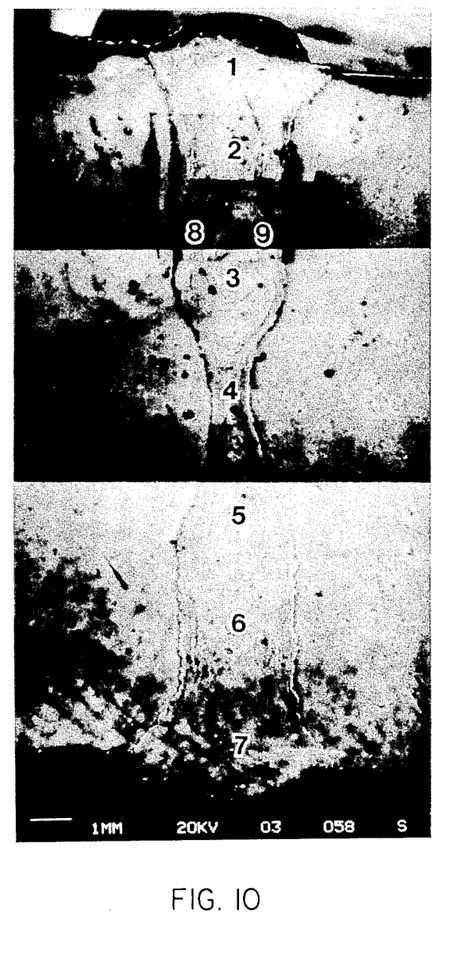
FIG. 10 is a photograph of an alloyed zone made in accordance with the embodiment of FIGS. 1A-1C.

FIG. 10 is a composite photograph of an alloyed zone 14 made in accordance with the embodiment of the invention illustrated in FIG. 1A through 1C. A 0.029 inch thick nickel insert was placed between two sections of copper and a high energy beam apparatus (in this particular example, a 12 kw laser) passed over the top and bottom surfaces of the sandwich, more particularly, over the metal insert and the adjacent areas of the metal sections at a travel speed of 10 inches per minute with a delivered beam power of 12 kilowatts at a focal point elevation of 0 i.e. the beam focus and the top surface were coplanar. Elemental areas approximately 0.032 inches times 0.032 inches were analyzed. These areas are at the general locations indicated by the numerals 1 to 9 in FIG. 10 and the analysis was conducted by means of energy dispersive x-ray analysis techniques. The results of the analysis are indicated by the following Table 1 showing the weight percentage of nickel and copper in the alloyed zone at the particular given location. A resistance measurement in the direction parallel to the alloyed zone 14 resulted in a value of $3.5 \times 10^{-6}$ ohms, and a resistance of $6.05 \times 10^{-6}$ ohms in a direction perpendicular thereto. This is only an example of alloying by high energy beam; more precise control of alloying and more uniform alloying through the layer is considered readily achievable by beam parameter optimization.

TABLE 1

| Area # | Analysis Ni | (wt. %) Cu |
|---|---|---|
| 1 | 27.67 | 72.33 |
| 2 | 30.77 | 69.23 |
| 3 | 33.41 | 66.59 |
| 4 | 55.01 | 44.99 |
| 5 | 34.38 | 65.62 |
| 6 | 28.86 | 71.14 |
| 7 | 25.95 | 74.05 |
| 8 | 33.14 | 66.86 |
| 9 | 31.24 | 68.76 |

Although the invention has been described by way of example with respect to electrical conducting apparatus, the anisotropic resistivity bodies fabricated in accordance with the present invention, may also be applicable to heat conduction apparatus wherein a preferred direction of heat flow may be desired. The same concept could produce bodies of anisotropic mechanical or acoustic properties. Further, although copper and nickel have been described as the first metal and metal insert respectively, other alloy combinations are possible such as copper, silver, aluminum, and gold base systems. A metal insert containing beryllium may be utilized with the resulting alloyed zone being capable of providing a lubricating action in those instances where the body may be utilized as an electrical brush in a dynamoelectric machine.

We claim:

1. A method of making an anisotropic resistivity body comprising the steps of:
   (A) providing a plurality of sections of a first metal;
   (B) placing a plurality of relatively thin sections of a metal insert between said sections of said first metal, said first metal and said metal insert having different compositions;
   (C) passing over each said section of said metal insert with a high energy beam so as to cause on each said pass an alloyed zone comprised of said first metal and metal insert; and
   (D) removing any undesired excess metal so as to form a body having first and second opposed surfaces and alternate zones of different resistivity wherein each of said alloyed zones extend all the way from said first to said second surface.

2. A method according to claim 1 wherein:
   (A) each said alloyed zone has a higher electrical resistivity than an adjacent section of first metal.

3. A method according to claim 1 which includes the steps of:
   (A) providing a body of said first metal;
   (B) machining grooves in said body to define said alternate zones; and
   (C) placing said thin sections of said metal insert within said grooves.

4. A method according to claim 1 which includes the steps of:
   (A) providing a body of said first metal;
   (B) machining holes in said body to define said alternate zones; and
   (C) placing metal inserts in the form of thin rods within said holes.

5. A method according to claim 1 which includes the steps of:
   (A) providing a plurality of separate members of said first metal;
   (B) placing said thin sections of metal insert between alternate ones of said members.

6. A method according to claim 1 wherein:
   (A) said metal insert is a unitary piece of metal.

7. A method according to claim 1 wherein:
   (A) said metal insert is comprised of a plurality of layers of metal.

8. A method according to claim 3 wherein:
   (A) said body has first and second opposed surfaces;
   (B) said metal inserts in said grooves extend from said first surface toward said second surface; and which includes the steps of,
   (C) passing said high energy beam over said metal inserts at said first surface to generate an alloyed zone which extends from said first surface toward, but not to, said second surface; and
   (D) machining said second surface to expose said alloyed zones.

9. A method according to claim 8 wherein:
   (A) said high energy beam is of insufficient power to cause alloying to the entire depth of a metal insert such that after said machining said metal insert is exposed; and which includes the step of,
   (B) passing said high energy beam over the exposed metal inserts to form alloyed zones which meet the first formed alloyed zones.

10. A method according to claim 3 wherein:
    (A) said body has first and second opposed surfaces;
    (B) said metal inserts in said grooves extend from said first surface toward said second surface; and which includes the steps of,
    (C) passing said high energy beam over said metal inserts at said first surface to generate an alloyed zone which extends from said first surface toward, but not to, said second surface;
    (D) providing grooves in said second surface opposite said alloyed zones, after they have solidified;
    (E) placing said metal inserts in said latter grooves; and
    (F) passing over said latter metal inserts with said high energy beam to form alloyed zones which meet the previously formed alloy zones.

11. A method according to claims 8 or 9 or 10 wherein:
    (A) said body is a hollow cylinder.

* * * * *